(12) United States Patent
Huang et al.

(10) Patent No.: US 12,545,092 B2
(45) Date of Patent: Feb. 10, 2026

(54) BATTERY PACK MOUNTING STRUCTURE HAND TRUCK HAVING THE SAME

(71) Applicant: HUIZHOU ROYPOW TECHNOLOGY CO., LTD, Huizhou (CN)

(72) Inventors: Guoai Huang, Huizhou (CN); Quanfu Zou, Huizhou (CN)

(73) Assignee: HUIZHOU ROYPOW TECHNOLOGY CO., LTD, Huizhou (CN)

(*) Notice: Subject to any disclaimer, the term of this patent is extended or adjusted under 35 U.S.C. 154(b) by 462 days.

(21) Appl. No.: 18/299,356

(22) Filed: Apr. 12, 2023

(65) Prior Publication Data

US 2024/0286476 A1    Aug. 29, 2024

(30) Foreign Application Priority Data

Feb. 27, 2023  (CN) .......................... 202320349219.7

(51) Int. Cl.
*B60K 1/04* (2019.01)
*B60S 5/06* (2019.01)

(52) U.S. Cl.
CPC .  *B60K 1/04* (2013.01); *B60S 5/06* (2013.01)

(58) Field of Classification Search
CPC .............. B60S 5/06; B60K 2001/0416; B60K 2001/0438; B60K 1/04; B60L 50/66; B60L 50/64

USPC ......................................................... 180/68.5
See application file for complete search history.

(56) References Cited

U.S. PATENT DOCUMENTS

| | | | |
|---|---|---|---|
| 10,468,644 B2* | 11/2019 | Niedzwiecki | H01M 50/209 |
| 11,440,391 B2* | 9/2022 | Smith | H01M 50/244 |
| 12,017,502 B2* | 6/2024 | Huang | B60H 1/00357 |
| 2013/0095360 A1* | 4/2013 | Niedzwiecki | H01M 10/0413 429/100 |
| 2013/0248267 A1* | 9/2013 | Nitawaki | B60K 1/04 180/68.5 |
| 2013/0319780 A1* | 12/2013 | Nitawaki | B60K 1/04 180/68.5 |
| 2021/0229541 A1* | 7/2021 | Smith | B60K 1/04 |
| 2023/0356560 A1* | 11/2023 | Huang | B60H 1/00507 |

* cited by examiner

*Primary Examiner* — James A Shriver, II
*Assistant Examiner* — Hilary L Johns

(57) ABSTRACT

A battery pack mounting structure and a truck are provided. The battery pack mounting structure includes a connecting member, a clamping plate, a first clamping member, and a second clamping member. The connecting member is configured to load a battery pack. The back plate is connected to the connecting member. The clamping plate is spaced apart from a side of the back plate away from the connecting member. A clamping space configured to accommodate the crossbeam is formed between the clamping plate and the back plate. The first clamping member and the second clamping member that are provided between the clamping plate and the back plate, and configured to fix the crossbeam between the clamping plate and the back plate in a vertical direction.

9 Claims, 2 Drawing Sheets

BATTERY PACK MOUNTING STRUCTURE HAND TRUCK HAVING THE SAME

CROSS-REFERENCE TO RELATED APPLICATIONS

This application claims priority to Chinese patent application No. 202320349219.7 filed with the Chinese Patent Office on Feb. 27, 2023, entitled "BATTERY PACK MOUNTING STRUCTURE HAND TRUCK HAVING THE SAME", the entire content of which is incorporated by reference.

TECHNICAL FIELD

The present disclosure relates to the technical field of automobile battery replacement, in particular to a battery pack mounting structure for truck battery replacement and a truck having the same.

BACKGROUND

With the development of truck battery replacement technology, a battery pack needs to be fixed to a truck, and the battery pack needs to be able to withstand various shocks and vibrations.

In conventional technology, holes are drilled in a cross member of the truck, and the battery pack is fixed to the cross member through the holes.

However, the conventional way of fixing the battery pack tends to damage the crossbeam.

SUMMARY

Accordingly, a battery pack mounting structure and a truck having the same are provided.

A battery pack mounting structure for mounting a battery pack on a crossbeam of a vehicle body is provided. The battery pack mounting structure includes a connecting member, a clamping plate, a first clamping member, and a second clamping member. The connecting member is configured to load the battery pack. The back plate is connected to the connecting member. The clamping plate is spaced apart from a side of the back plate away from the connecting member. A clamping space configured to accommodate the crossbeam is formed between the clamping plate and the back plate. The first clamping member and the second clamping member that are provided between the clamping plate and the back plate, and configured to fix the crossbeam between the clamping plate and the back plate in a vertical direction.

A truck is also provided. The truck includes a vehicle body, a battery pack, and the aforementioned battery pack mounting structure configured to mount the battery pack on a crossbeam of the vehicle body.

Details of one or more embodiments of the present disclosure are set forth in the following drawings and descriptions. Other objects, purposes and advantages will become apparent upon review of the following specification, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
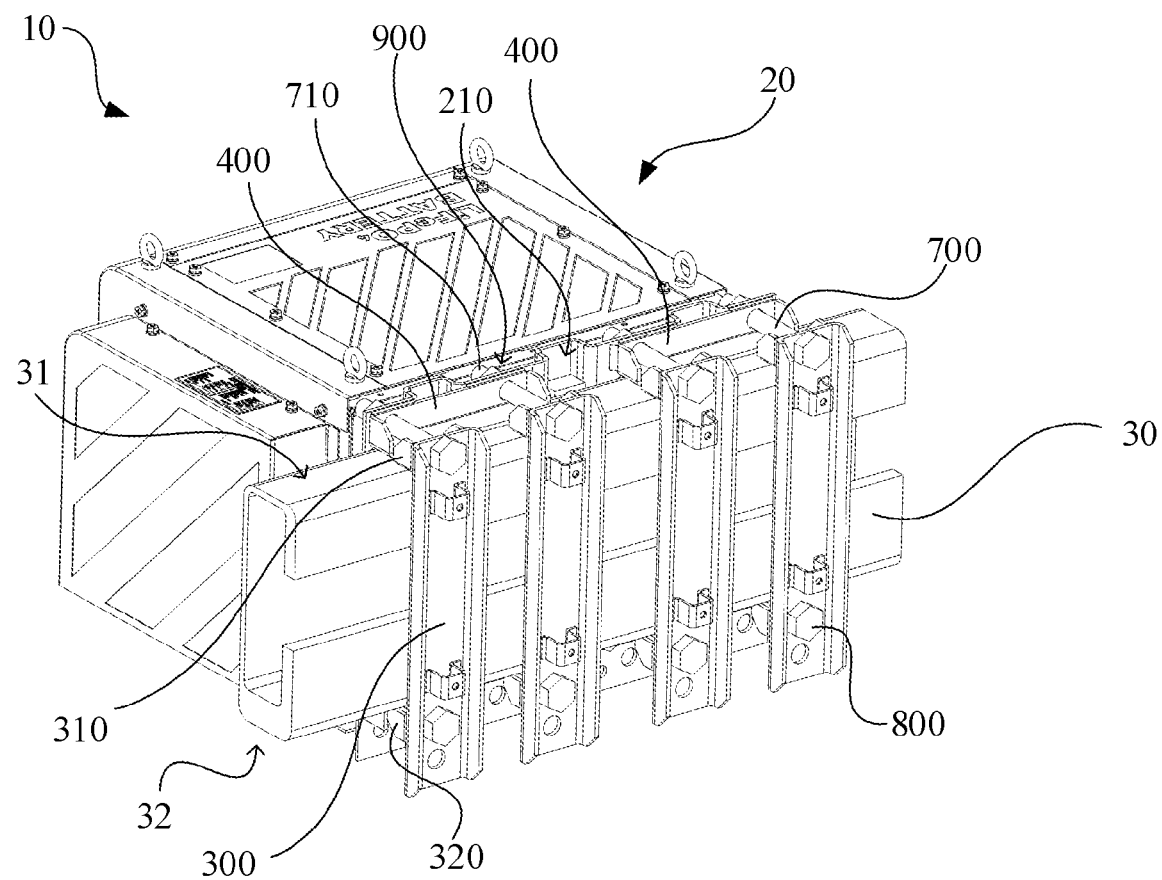
FIG. 1 is a perspective view of a battery pack mounting structure according to an embodiment of the present disclosure.

REFERENCE NUMBERS 10, battery pack mounting structure; 20, battery pack; 30, crossbeam; 31, upper end surface; 32, lower end surface; 100, connecting member; 110, protrusion; 200, back plate; 210, groove; 220, first adjusting hole; 230, second adjusting hole; 300, clamping plate; 310, first clamping portion; 320, second clamping portion; 400, first clamping member; 410, first clamping surface; 500, second clamping member; 510, second clamping surface; 600, fixing bolt; 700, first locking bolt; 710, tail portion; 800, second locking bolt; 900, connection gap.

DETAILED DESCRIPTION

In order to make the above objects, features and advantages of the present application more obvious and easier to understand, the specific embodiments of the present application are described in detail below in combination with the accompanying drawings. Many specific details are set forth in the following description to facilitate a full understanding of the invention. However, the present application can be implemented in many ways different from those described herein, and those skilled in the art can make similar improvements without violating the connotation of the invention. Therefore, the invention is not limited by the specific embodiments disclosed below.

In the description of the present application, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which is only for the convenience of describing the present application and simplifying the description, rather than indicating or implying that the device or element must have a specific azimuth, be constructed and operated in a specific azimuth, so it cannot be understood as a limitation of the present application.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present application, "multiple" means at least two, such as two, three, etc., unless otherwise expressly and specifically defined.

In the present disclosure, unless otherwise expressly specified and limited, the terms "mount", "connect", "contact", "fix" and other terms should be understood in a broad sense, for example, they can be fixed connections, removable connections, or integrated. It can be mechanical connection or electrical connection. It can be directly connected or indirectly connected through an intermediate medium. It can be the connection within two elements or the interaction relationship between two elements, unless otherwise expressly limited. For those skilled in the art, the specific meaning of the above terms in the present application can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Figure 2:
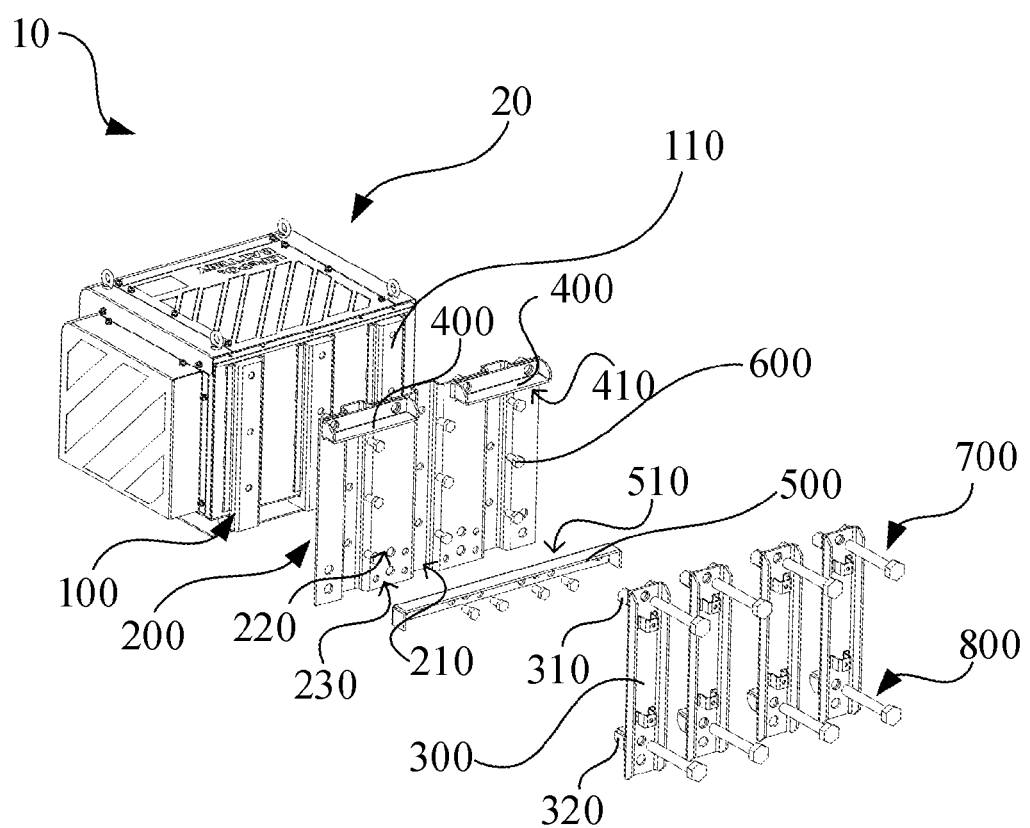
FIG. 2 is an exploded view of the battery pack mounting structure of FIG. 1.

Referring to FIGS. 1 and 2, a battery pack mounting structure 10 is provided according to an embodiment of the present disclosure, which is configured to mount a battery pack 20 on a crossbeam 30 of a vehicle body. The battery pack mounting structure 10 includes a connecting member 100, a back plate 200, a clamping plate 300, a first clamping member 400, and a second clamping member 500. The connecting member 100 is configured to load the battery pack 20. The back plate 200 is connected to the connecting member 100. The clamping plate 300 is spaced apart from a side of the back plate 200 away from the connecting member 100. A clamping space is formed between the clamping plates 300 and the back plate 200, and the clamping space is configured to accommodate the crossbeam 30. The first clamping member 400 and the second clamping member 500 are provided between the clamping plates 300 and the back plate 200, and are configured to fix the crossbeam 30 between the clamping plate 300 and the back plate 200 in a vertical direction.

In the battery pack mounting structure 10, the crossbeam 30 is clamped in the clamping space formed by the clamping plate 300 and the back plate 200, so that the battery pack mounting structure 10 can be firmly connected to the crossbeam 30 without damaging a structure of the crossbeam 30, and the battery pack 20 can be firmly mounted to the crossbeam 30. Further, the configuration of the first clamping member 400 and the second clamping member 500 can fix the crossbeam 30 in the vertical direction, so that an anti-vibration capability of the battery pack mounting structure 10 in the vertical direction is improved, and the battery pack 20 can withstand various shocks and vibrations thanks to the battery pack mounting structure 10.

It should be noted that the aforementioned battery pack installation structure 10 can also be applied to various crossbeams, such as cylindrical crossbeams or cuboid crossbeams, etc. Crossbeams of different shapes can be clamped, as long as the first clamping member 400 and the second clamping member 500 can abut against the crossbeam 30 and the crossbeam 30 is clamped between the back plate 200 and the clamping plate 300. In addition, the battery pack mounting structure 10 is not limited to fixing and mounting the battery pack 20, and the battery pack 20 may be replaced by various devices, electrical elements, etc. Further, the connecting member 100 may be various connecting structures configured to connect the battery pack 20 or other devices and elements, such as a box or a connecting plate. Specifically, in the field of truck battery replacement, since the battery pack 20 mounted on a truck needs to have an ability to withstand various shocks and vibrations, the connecting member 100 is a connecting plate or a connecting block. The connecting member 100 is connected to the battery pack 20 by welding or bolts, so as to load and fix the battery pack 20 on the battery pack mounting structure 10.

Further, the back plate 200 and the clamp plate 300 can be designed in different lengths corresponding to different widths of the crossbeam 30 of different trucks in the vertical direction. Since the battery pack mounting structure 10 includes the back plate 200 and the clamping plate 300, on one hand, the battery pack 20 can be fixed without damaging the structure of the crossbeam 30 and can be easily disassemble, on the other hand, the back plate 200 and the clamping plate 300 are in direct contact with the crossbeam 30, the battery pack mounting structure 10 only need to be designed to have the back plate 200 and the clamping plate 300 adapt to the crossbeam 30 with different size. Compared with the conventional way of directly fixing the battery pack 20 to the crossbeam 30, a cost of secondary development of the battery pack 20 to adapt to the crossbeam 30 of different size is greatly saved.

As shown in FIG. 1, in some embodiments, the battery pack mounting structure 10 includes a plurality of fixing bolts 600. The connecting member 100 includes a plurality of protrusions 110, and each protrusion 110 is provided with a plurality of bolt holes spaced apart. The back plate 200 abuts against the protrusions 110, and the fixing bolts 600 extend through the bolt holes to fix a relative position of the back plate 200 and the connecting member 100. It should be noted that the aforementioned plurality of bolt holes refers to two or more, such as two, three, four, five or six bolt holes. Specifically, the plurality of protrusions 110 are directly connected to the battery pack 20. Alternatively, the connecting member 100 includes a plurality of protrusions 110 and a plate, the plurality of protrusions 110 and the plate may be welded or integrally formed, and the battery pack 20 is loaded by connecting the plate with the battery pack 20. The bolt holes provided on the protrusions 110 help to the mounting of the fixing bolts 600, which avoids providing bolt holes on the battery pack 20 and protects a structural integrity of the battery pack 20.

Further, as shown in FIG. 1, in an embodiment, a side of the back plate 200 away from the protrusion 110 is provided with a plurality of grooves 210. Specifically, the back plate 200 is bent, such that the side of the back plate 200 away from the protrusion 110 forms the grooves 210 spaced apart. The groove 210 is configured to accommodate the heads of the fixing bolts 600, which helps to reduce an influence of the heads of the fixing bolts 600 on a flatness when a surface of the back plate 200 away from the battery pack 20 is mounted on the crossbeam 30, so as to improve a fastening effect of the battery pack mounting structure 10 on the crossbeam 30.

Furthermore, as shown in FIG. 2, in one embodiment, the battery pack mounting structure 10 further includes a first locking bolt 700 and a second locking bolt 800. The clamping plate 300, the first clamping member 400, and the back plate 200 are connected by the first locking bolt 700. The clamping plate 300, the second clamping member 500, and the back plate 200 are connected by the second locking bolt 800. A connection gap 900 is formed between the back plate 200 and the connecting member 100. The connection gap 900 is located on at least one side of the protrusion 110, and tail portions 710 of the first locking bolt 700 and the second locking bolt 800 extend through the back plate 200 and are accommodated in the connection gap 900. Specifically, the back plate 200 is bent, so that the connection gap 900 is formed between the back plate 200 and the connecting member 100. The connection gap 900 provides a space for the mounting of the first locking bolt 700 and the second locking bolt 800, the battery pack mounting structure 10 can be fastened, and the first locking bolt 700 and the second locking bolt 800 are prevented from damaging the battery pack 20 during a mounting process.

As shown in FIGS. 1 and 2, in some embodiments, the first clamping member 400 includes a first clamping surface 410. The second clamping member 500 includes a second clamping surface 510 opposite to the first clamping surface 410. The crossbeam 30 includes an upper end surface 31 and a lower end surface 32 opposite to each other. The first clamping surface 410 and the second clamping surface 510 are configured to abut against the upper end surface 31 and the lower end surface 32, respectively. Specifically, the crossbeam 30 is shaped as rectangular rod, and the upper end surface 31 and the lower end surface 32 are two opposite surfaces of the crossbeam 30 in the vertical direction. It should be understood that a distance between the first clamping surface 410 and the second clamping surface 510 is the same as a distance between the upper end surface 31 and the lower end surface 32, so that the battery pack mounting structure 10 can be connected on the crossbeam 30. The battery pack mounting structure 10 cannot move in the vertical direction, thereby improving the anti-vibration capability of the battery pack mounting structure 10. Further, since the first clamping member 400 and the second clamping member 500 are provided independently from the back plate 200 and the clamping plate 300, the distance between the first clamping surface 410 and the second clamping surface 510 can be adjusted to meet the crossbeam 30 of any size.

As shown in FIG. 1, in some embodiments, the back plate 200 is provided with a plurality of first adjusting holes 220 and a plurality of second adjusting holes 230. The first adjusting holes 220 and the second adjusting holes 230 are configured to adjust a position of the second clamping member 500. Specifically, the second clamping member 500 is connected to the back plate 200 by bolts extending through the first adjusting holes 220 or the second adjusting holes 230. Specifically, the first adjusting holes 220 or the second adjusting holes 230 are a row of bolt holes provided on the same height of the back plate 200, and the second clamping member 500 is in a shape of a strip. The first adjusting holes 220 and the second adjusting holes 230 help to increase an application range of the battery pack mounting structure 10 to the crossbeams 30 of different specifications. That is, the corresponding first adjusting holes 220 or the second adjusting holes 230 are selected to mount the second clamping member 500 according to the width in the vertical direction of the crossbeam 30.

As shown in FIGS. 1 and 2, in some embodiments, the battery pack mounting structure 10 includes a plurality of first clamping members 400. The plurality of first clamping members 400 are spaced apart at a same end of the back plate 200, and distances between each first clamping member 400 and the second clamping members 500 are the same. Specifically, when two first clamping members 400 are provided, the two first clamping members 400 are mounted symmetrically on the back plate 200. When more than two first clamping members 400 are provided, the first clamping members 400 are evenly spaced on the back plate 200. The first clamping members 400 are arranged separately (which is different from a strip-shaped integrated arrangement of the second clamping members 500), which helps to improve a working independence of the first clamping members 400, so that when one of the first clamping members 400 is loosened, other first clamping members 400 can be unaffected, and thus can cooperate with the second clamping members 500 to maintain a clamping force on the crossbeam 30 in the vertical direction, so as to improve the anti-vibration capability of the battery pack mounting structure 10 in the vertical direction.

As shown in FIG. 1 and FIG. 2, in some embodiments, a plurality of clamping plates 300 are provided, and the plurality of the clamping plates 300 are spaced apart along a length direction of the second clamping member 500. Specifically, the plurality of clamping plates 300 are provided to fasten the crossbeam 30, so that the fasten action of the plurality of clamping plates 300 on the crossbeam 30 does not affect each other, thereby facilitating the improvement of the fasten action of the battery pack mounting structure 10 on the crossbeam 30 and improving the fixing effect of the battery pack mounting structure 10 on the battery pack 20.

Further, as shown in FIG. 1 and FIG. 2, in an embodiment, each of the plurality of clamping plates 300 includes a first clamping portion 310 and a second clamping portion 320 that are opposite to each other. The crossbeam 30 includes an upper end surface 31 and a lower end surface 32 that are opposite to each other. The first clamping portion 310 and the second clamping portion 320 are configured to abut against the upper end surface 31 and the lower end surface 32, respectively. Specifically, the first clamping portion 310 and the first clamping portion 320 are provided at both ends of the clamping plate 300, respectively, and the arrangement of the first clamping portion 310 and the first clamping portion 320 helps to further limit a movement of the battery pack mounting structure 10 in the vertical direction, so as to improve the anti-vibration capability of the battery pack mounting structure 10, so that the battery pack 20 can withstand various shocks and vibrations under the action of the battery pack mounting structure 10.

A truck is also provided according to an embodiment of the present disclosure. The truck includes the vehicle body, the battery pack 20, and the aforementioned battery pack mounting structure 10 configured to mount the battery pack 20 on the crossbeam 30 of the vehicle body.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:

1. A battery pack mounting structure for mounting a battery pack on a crossbeam, comprising:
   a connecting member configured to load the battery pack;
   a back plate connected to the connecting member;
   a clamping plate spaced apart from a side of the back plate away from the connecting member, wherein a clamping space configured to accommodate the crossbeam is formed between the clamping plate and the back plate;
   a first clamping member and a second clamping member that are provided between the clamping plate and the back plate, and configured to fix the crossbeam between the clamping plate and the back plate in a vertical direction;
   a fixing bolt; and
   wherein the connecting member further comprises a protrusion provided with a bolt hole, the back plate abuts against the protrusion, and the fixing bolt extends through the bolt hole to fix a relative position of the back plate and the connecting member, and a side of the back plate away from the protrusion is provided with a groove configured to accommodate a head of the fixing bolt.

2. The battery pack mounting structure according to claim 1, further comprising a first locking bolt, wherein the clamping plate, the first clamping member, and the back plate are connected by the first locking bolt, a connection gap is formed between the back plate and the connecting member, the connection gap is located on at least one side of the protrusion, and a tail portion of the first locking bolt extends through the back plate and is accommodated in the connection gap.

3. The battery pack mounting structure according to claim 2, further comprising a second locking bolt, wherein the clamping plate, the second clamping member, and the back plate are connected by the second locking bolt, and a tail portion of the second locking bolt extends through the back plate and is accommodated in the connection gap.

4. The battery pack mounting structure according to claim 1, wherein the first clamping member comprises a first clamping surface, the second clamping member comprises a second clamping surface opposite to the first clamping surface, the crossbeam comprises an upper end surface and a lower end surface opposite to each other, and the first clamping surface and the second clamping surface are configured to abut against the upper end surface and the lower end surface, respectively.

5. The battery pack mounting structure according to claim 1, wherein the back plate is provided with a first adjusting hole and a second adjusting hole, the second clamping member is connected to the back plate by a bolt extending through the first adjusting hole or the second adjusting hole.

6. The battery pack mounting structure according to claim 1, wherein a plurality of first clamping members are provided, the plurality of first clamping members are spaced apart at a same end of the back plate, and distances between each first clamping member and the second clamping members are the same.

7. The battery pack mounting structure according to claim 1, wherein a plurality of clamping plates are provided, and the plurality of clamping plates are spaced apart along a length direction of the second clamping member.

8. The battery pack mounting structure according to claim 7, wherein the clamping plate is provided with a first clamping portion and a second clamping portion that are opposite to each other, the crossbeam comprises an upper end surface and a lower end surface that are opposite to each other, and the first clamping portion and the second clamping portion are configured to abut against the upper end surface and the lower end surface, respectively.

9. A truck, comprising a crossbeam, a battery pack, and a battery pack mounting structure of claim 1 configured to mount the battery pack on the crossbeam.

* * * * *